United States Patent

[11] 3,604,808

[72] Inventor Laurence S. Watkins
 Hightstown, N.J.
[21] Appl. No. 872,836
[22] Filed Oct. 31, 1969
[45] Patented Sept. 14, 1971
[73] Assignee Western Electric Company, Incorporated
 New York, N.Y.

[54] DETECTION OF CUMULATIVE REGISTRATION ERRORS ON PHOTOMASKS USING OPTICAL INTERFERENCE FRINGES
6 Claims, 8 Drawing Figs.

[52] U.S. Cl. .................................................. 356/71, 356/106
[51] Int. Cl. .................................................. G06k 9/08, G01b 9/02
[50] Field of Search .......................................... 356/71, 106–113

[56] References Cited
UNITED STATES PATENTS
3,544,197 12/1970 Weaver ...................... 356/71 X Primary Examiner—Ronald L. Wibert
Assistant Examiner—Conrad Clark
Attorneys—W. M. Kain, R. P. Miller, R. C. Winter and B. I. Levine ABSTRACT: A fringe pattern generated by a pair of intersecting light beams of the same wavelength is employed in a spatial filtering technique to detect cumulative positional errors along a superposed linear test array of identical elements having a nominally fixed pitch between corresponding border edges, as in a row of repetitive images on an array-type photomask. The angle between the beams is adjusted so that the spatial period between points of equal intensity on the fringe pattern is an integral submultiple of the nominal spacing between corresponding edges of adjacent elements of the test array. The fringe pattern is spatially modulated by the test array and its diffraction pattern focused on a low-pass optical filter, which suppresses the spatial period of the fringe pattern. The light passed by the filter is reimaged to form a visual replica of the gross features (i.e., the edges) of the array elements, such edges having a cyclic variation of illumination because of the superposed portions of the fringe pattern. The period of the cyclic variation is inversely proportional to the magnitude of the cumulative positional error along the test array.

PATENTED SEP 14 1971

INVENTOR
L. S. WATKINS

BY B.R.Levine

ATTORNEY

DETECTION OF CUMULATIVE REGISTRATION ERRORS ON PHOTOMASKS USING OPTICAL INTERFERENCE FRINGES

BACKGROUND OF THE INVENTION

Conventional photomask transparencies used in the large-scale manufacture of semiconductor and thin-film devices and integrated circuits may contain two-dimensional arrays of normally identical elements, each element being representative of a separate device or circuit. The pitch of the elements in any row or column of the array (i.e., the distance between corresponding border edges of adjacent elements) is nominally fixed at a predetermined distance by a conventional "step-and-repeat" mechanism, which optically reduces a master pattern and successively registers the reduced pattern row by row on the transparency to form the array.

However, eccentricities and similar imperfections in the step-and-repeat apparatus may result in a cumulative positional error during the registration of the successive elements in a row of the array. Such step-and-repeat errors are manifested, e.g., by a progressive increase or decrease of the spacing between corresponding border edges on successive elements. If undetected, the resulting misalignments of the elements may cause difficulties during subsequent processing steps of the circuits or devices produced with the aid of the defective mask; e.g., during selective etching of material from or deposition of material on the arrayed circuits or devices, and during the later separation of the array into individual units.

While inspection equipment capable of detecting positional errors between an adjacent pair of elements in a row with a resolution of about 0.1 mil has already been proposed, such equipment cannot attain this resolution when measuring cumulative errors across a plurality of successive elements in the row. Thus it may happen that when large numbers of minute elements are employed in each row of the mask, the element-to-element errors may be too small to be detected by such inspection equipment, while the total cumulative positional error between more remotely spaced elements in a row may build up to a value that exceeds the tolerance limits of the mask.

SUMMARY OF THE INVENTION

The technique of the present invention may be employed to detect and measure, to within a resolution of 0.1 mil or less, cumulative positional errors along a linear array of identical elements having corresponding regions (illustratively border edges) that are nominally spaced apart by a predetermined distance. An optical fringe pattern defined by a pair of intersecting light beams of equal wavelength is directed through the array and is spatially modulated thereby. The spatial period of the fringe pattern, which is a function of the angle of intersection between the incident beams, is adjusted to be less than half the predetermined distance and preferably equal to an integral submultiple of the predetermined distance. In an illustrative embodiment, the spatially modulated light transmitted through the array is focused by a first lens onto a low-pass optical filter, which blocks the spatial wavelength corresponding to the spatial period of the pattern but passes the longer wavelengths resulting from modulation of the fringe pattern by the border edges. A second lens reimages the light passed by the filter to define a visual replica of the border edges of the array, the intensity of the edge replicas varying with their alignment to the fringe pattern. Because of the period chosen for the fringe pattern, the intensity of illumination of successive edges in the replica array by the superposed portions of the modulated fringe pattern varies cyclically with a period inversely proportional to the magnitude of the cumulative positional error. A variation in intensity from a maximum to a minimum between a pair of spaced edges on the replica array is indicative of a cumulative error therebetween of one half the spatial period of the pattern.

To facilitate visual inspection of such cumulative positional errors, a display screen may be employed behind the reimaging lens, and suitable means may be provided for projecting a visual image of the flawed replica array with its cyclically repetitive pattern of illumination onto the screen.

BRIEF DESCRIPTION OF THE DRAWING

The nature of the invention and its advantages will appear more fully from the following detailed description taken in conjunction with the appended drawing, in which.

DETAILED DESCRIPTION

Figure 1:
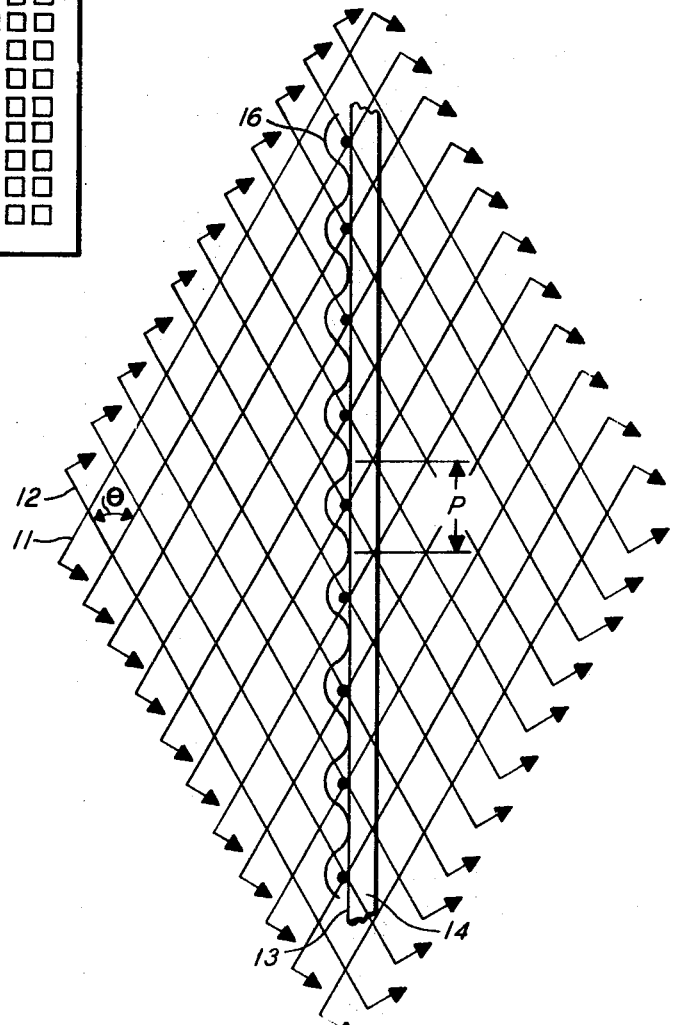
FIG. 1 is a pictorial representation of the generation of an optical fringe pattern along a surface by the intersection of a pair of coherent light beams having identical wavelengths.

Referring now in more detail to the drawing, FIG. 1 shows a pair of coherent light beams 11 and 12 having identical wavelengths and respectively represented by plane wavefronts. The beams 11 and 12 intersect at an angle $\theta$ as shown and impinge on a surface 13 of an optical transparency 14.

The intersecting beams combine in a well-known manner to form an interference fringe pattern 16 represented schematically in the form of a standing wave along the surface 13. The spatial period, designated P, between points of equal illumination intensity of the fringe pattern varies in a well-known manner in accordance with the angle of intersection $\theta$ between the beams 11 and 12. The regions of mutual reinforcement of the beams 11 and 12 on the surface 13 define the maximum amplitude points of the standing wave 16, while the regions of mutual cancellation of the beams define minimum amplitude points halfway between the amplitude maxima.

Figure 2:
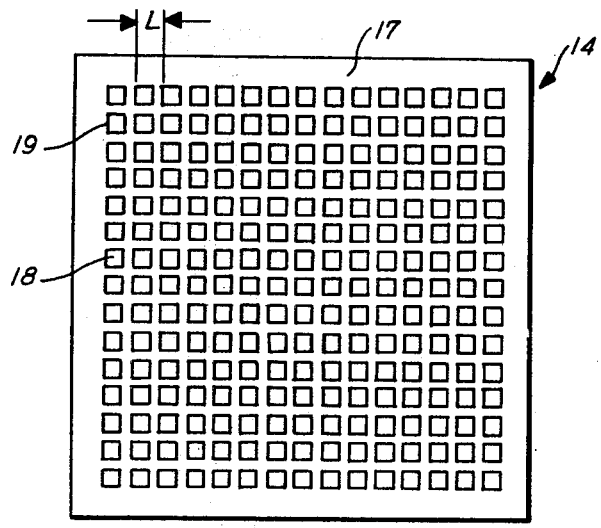
FIG. 2 is a pictorial representation of a photomask transparency having a two-dimensional periodic array of normally identical elements.

As shown best in FIG. 2, the transparency 14 may illustratively be an integrated circuit photomask formed from transparent photographic film. The photomask has a surface 17 containing a square planar array of identical photographic images 18 (hereafter elements 18) having linear border edges 19—19 and distributed in 15 rows, with 15 elements appearing in each row. Such an array may be produced, e.g., by subjecting the film to a "step-and-repeat" apparatus (not shown) which registers the elements 18 on the surface 17 in spaced relation along successive rows. Each element 18 (FIG. 2) in a given row has its left border edge 19 spaced from the corresponding reference edge of the adjacent element in the row by a nominal pitch distance L, which typically may be in the range of 20-150 mils.

Figure 3:
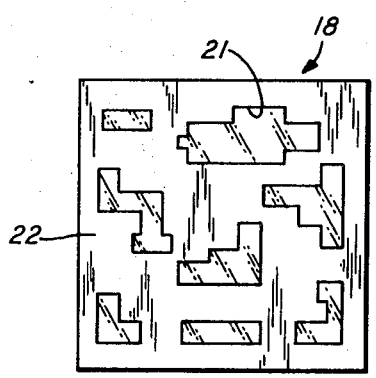
FIG. 3 is a pictorial representation of one form of element suitable for use in the photomask of FIG. 2.

As shown in FIG. 3, each element 18 has a prescribed circuit configuration corresponding to that of the resulting integrated circuit. Such configuration is characterized by a predetermined optical density distribution which, in the particular case illustrated, ideally comprises a plurality of optically transparent areas 21—21 against an opaque background 22.

In practice, it has been found that when certain types of eccentricities appear in the step-and-repeat apparatus, the spacing between the corresponding edges 19 (FIG. 2) of adjacent elements in a row on the photomask 14 does not remain at the nominal value L but instead progressively increases or decreases as a function of distance along the row by a small increment proportional to the distance L. While each increment of error between adjacent elements may, when taken alone, be too small for detection by known types of measuring equipment, the cumulative positional (or "registration") error along the row from the leftmost to the rightmost elements 18 may reach a value high enough to exceed the tolerance limits of the photomask.

Figure 4:
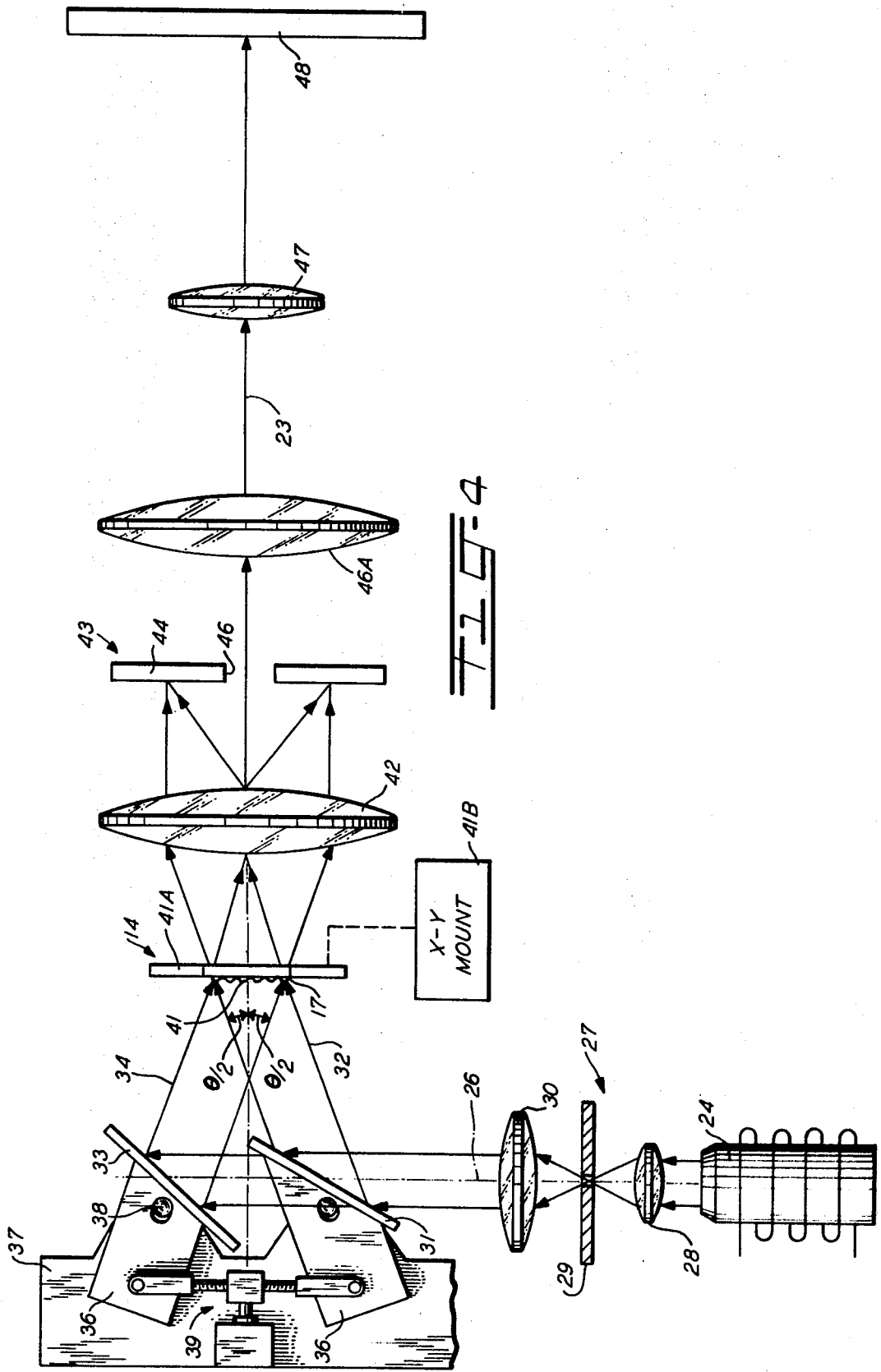
FIG. 4 is a diagram of a spatial-filtering system employing the technique of FIG. 1 for inspecting cumulative positional errors along a row of elements on the photomask of FIG. 2.

In accordance with the invention, a technique for accurately detecting and measuring extremely small cumulative positional errors along a row of elements of the photomask 14 may be carried out with the apparatus shown in FIG. 4, which employs optical fringe patterns of the general type shown in FIG. 1. In particular, the photomask 14 is mounted with its element-bearing surface 17 (FIG. 4) centered on and aligned perpendicular to a first axis 23. Coherent monochromatic light from a laser 24 is directed along a second axis 26 (disposed at right angles to the axis 23) and through a beam expander 27 comprising a first lens 28 and a pinhole mask 29. The light emanating from the mask 29 is collimated by a second lens 30 and directed at an adjustable half-silvered mirror 31, which is positioned to reflect half of the incident light (represented by a wavefront 32) at an angle $\theta/2$ with respect to the axis 23 and to transmit the remaining light along the axis 26 toward a second adjustable, totally reflecting mirror 33. The mirror 33 is adjusted to reflect the light incident thereon (represented by a wavefront 34) at an equal and opposite angle $\theta/2$ with respect to the axis 23.

The mirrors 31 and 33 are illustratively made adjustable by being movable mounted on holders 36 carried by a support 37 on opposite sides of the axis 23. The holders 36 are pivotally affixed to the support 37 as by pins 38—38 and are suitably linked by a conventional drive 39 for movement in equal increments with respect to the axis 23 so that the reflected wavefronts always define equal and opposite angles $\theta/2$ with respect to such axis.

The intersecting wavefronts 32 and 34 impinge on and illuminate the surface 17 of the photomask 14. An optical fringe pattern 41 resulting from the interference between the intersecting wavefronts is established along the surface 17 with a spatial period dependent on the angle $\theta$.

The photomask 14 is oriented such that the fringe pattern 41 is parallel to the rows of elements 18 in FIG. 2. For this purpose, the photomask 14 may be mounted in a suitable holder 41A (FIG. 4) linked to a conventional X-Y mount 41B, which may be adjusted to position the rows of elements horizontally or vertically with respect to the fringe pattern 41.

Such superposed fringe pattern, which is directed through and spatially modulated by the photomask 14, impinges on a third focusing lens 42. A low-pass optical filter 43, which passes spatial wavelengths longer than half the pitch L of the elements 18 (FIG. 2) on the mask 14 but blocks wavelengths shorter than half the pitch L, is located at the focal plane of the lens 42 (FIG. 4). Such a filter, which may be formed from an opaque member 44 having a suitable dimensioned central aperture 46, is adapted to suppress the finer details of the array pattern on the mask 14 (such as the transparent features 21 in FIG. 3) and enhance the definition of the border edges as described further below.

The transmitted low spatial frequency portions of the light focused on the filter 43 (FIG. 4) are reimaged by a fourth lens 46A and projected, via a fifth lens 47, onto a display screen 48 for inspection purposes. While not specifically illustrated in FIG. 4, the reimaged light will appear as a replica of the array shown in FIG. 2, but with the border edges 19 emphasized. The reimaged edges are illuminated by the respectively overlying portions of the spatially modulated fringe pattern.

The pattern of illumination of the reimaged border edges 19 by the fringe pattern is dependent on the relationship between the spatial period of the fringe pattern and the pitch L of the photomask elements. In further accordance with the invention, the spatial period P of the pattern is adjusted (e.g., by suitably setting the angle of intersection $\theta$ between the wavefronts 32 and 34 of FIG. 4) to be less than half the pitch L and preferably equal to an integral submultiple of the pitch L. When this is done, the low-pass filter 43 stops the relatively high spatial frequency of the fringe pattern so that only the reimaged border edges are illuminated. The intensity of illumination of the successive edges of the replica array by the superposed light depends upon the position of such edges with respect to the minima of the fringe pattern.

Figure 5:
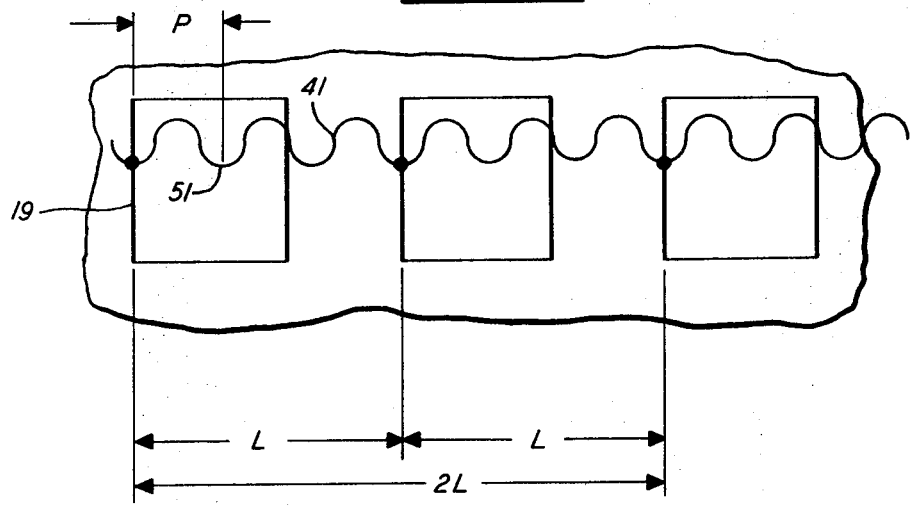
FIG. 5 is a diagrammatic view of a row of elements on the photomask of FIG. 2, depicting an invariant intensity of illumination of the edges by the superposed portions of a fringe pattern when the row of elements is substantially free from cumulative positional errors.
Figure 6:
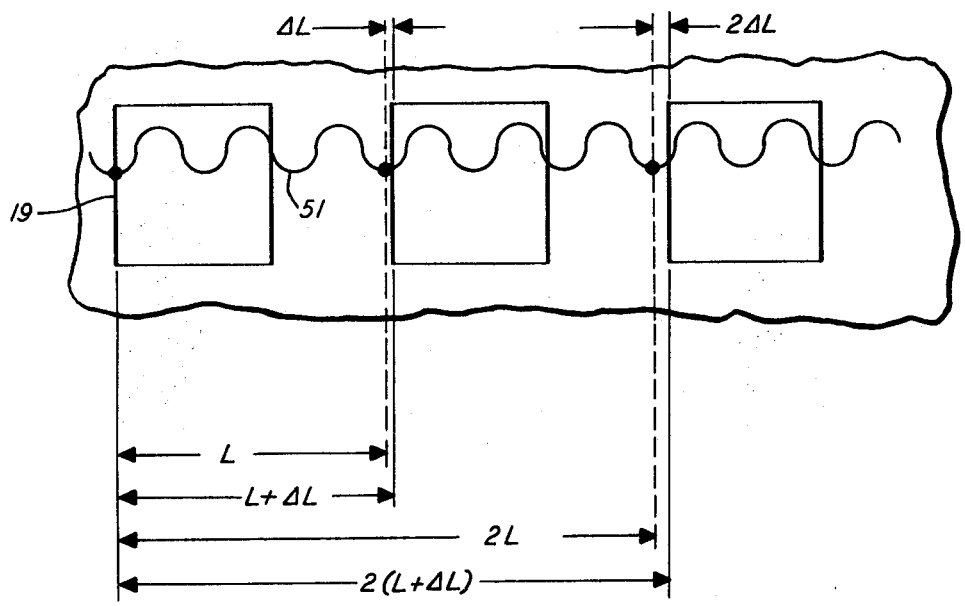
FIG. 6 is a diagrammatic view, similar to FIG. 5, of a row of elements on the photomask which are illuminated by the superposed portions of a fringe pattern, depicting the variation of illumination intensity of the edges when the associated row exhibits a cumulative positional error.

The manner in which this technique is employed in the arrangement of FIG. 4 to detect and measure cumulative positional errors on the photomask 14 is illustrated schematically in FIGS. 5 and 6. These figures respectively depict the first three elements of a typical row of border edges 19 on the mask 14 in each of two cases: (1) where the row of elements contain no cumulative positional errors, and (2) where the row contains a cumulative positional error (designated $\Delta L$) between corresponding left border edges 19 of adjacent elements.

In an illustrative mode of operation, the angle $\theta$ between the wavefronts 32 and 34 (FIG. 4) is adjusted by suitably manipulating the drive 39 until the spatial period P of the fringe pattern 41 is an integral submultiple of the element pitch L. In FIG. 5, for example, three periods of the pattern 41 (shown schematically as a standing wave superposed over the row of border edges 19) corresponds to the distance L, although in practice the spatial period P may be many times smaller than the distance L. The X-Y mount 41B (FIG. 4) for the photomask holder 41A may then be adjusted until the replica, on the display screen, of the leftmost border edge 19 (FIG. 5) receives the maximum illumination, i.e., until such edge coincides with a trough 51 of the standing wave and thus with a minimum of the fringe pattern. Thus, if as in FIG. 5, successive pairs of left border edges 19 are all exactly separated by the distance L so that no cumulative registration errors are present in the associated row, each such left edge will always coincide with corresponding ones of the trough 51 and the corresponding replica edges on the screen will exhibit equal illumination intensity. If, however, a cumulative positional error having an increment $\Delta L$ builds up between the successive pairs of the left edges 19 as depicted in FIG. 6, each successive edge 19 will be displaced in the same direction from the adjacent trough 51 by an amount equal to the product of the increment $\Delta L$ and the number of elements in the row between such edge 19 and the left edge of the leftmost element in the row. In particular, the second element in the array will manifest a displacement of $\Delta L$ between its left edge 19 and the adjacent trough 51, and its replica on the screen will exhibit a corresponding dropoff in illumination intensity; the third element in the array will manifest a displacement $2\Delta L$ between its left edge 19 and the adjacent trough 51, and its replica on the screen will exhibit a correspondingly greater dropoff in illumination intensity; and so forth. With this arrangement, therefore, a cumulative positional error along the row of elements on the mask 14 will be manifested, on the screen, by a progressive variation in illumination of the successive edges of the replica elements. Such variation will be cyclic in nature, with the cyclic period being inversely proportional to the magnitude of the cumulative positional error. A variation of intensity from a maximum to a minimum between a pair of spaced elements in the row is indicative of a cumulative error therebetween of one-half the spatial period of the fringe pattern.

In practice, it has been found that by proper adjustment of the angle θ (FIG. 4) between the wavefronts 32 and 34, the spatial period P may be made as low as 0.2 mils. Additionally, it has been found that when such short periods are employed, the resolution of the system is about one-third P. Hence, not only is the arrangement of the invention uniquely suitable for cumulative positional error measurements, but the resolution obtainable is better than even the 0.1 mil limit for element-to-element positional error measurements using present techniques.

Figure 7:
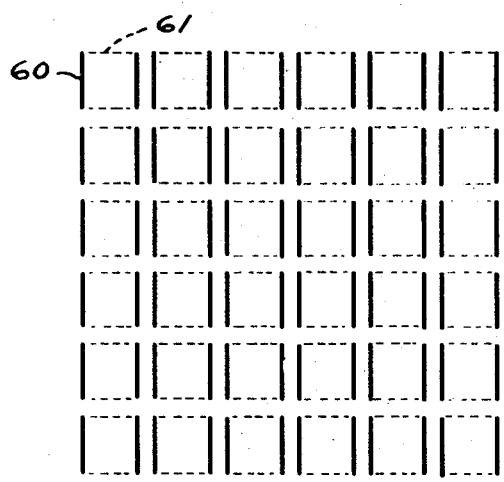
FIG. 7 is a diagram of one orientation of a reimaged replica of a photomask array which is being tested for cumulative positional errors in accordance with the invention, such orientation being substantially error-free.
Figure 8:
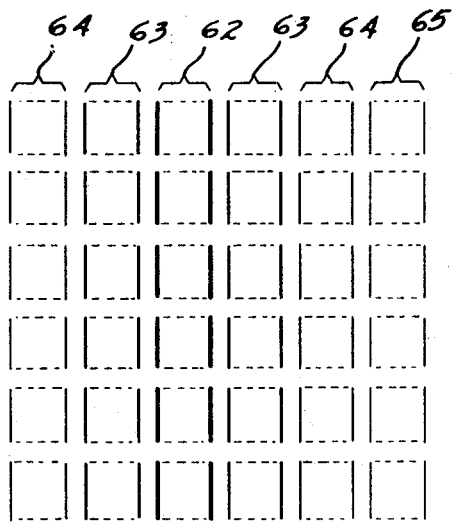
FIG. 8 is a diagram of a second orientation of a reimaged replica of the photomask array of FIG. 7, such orientation exhibiting a cumulative positional error.

FIGS. 7 and 8 diagrammatically illustrate typical results obtained when using the technique of the invention to detect cumulative positional errors in two orthogonal planes of a practical square array photomask. In FIGS. 7 and 8, heavier lines depict higher intensities of illumination. FIG. 7, for example, shows that in one orientation the mask is substantially free from cumulative positional errors; such orientation is disposed in the depicted horizontal plane of the optical fringe pattern. Vertical edges 60 have higher illumination as they are coincident with maxima of the spatially modulated fringe pattern, whereas horizontal edges 61 are suppressed because they are perpendicular to the fringe pattern. Finer details of the patterns within the edges are not shown. Note that in FIG. 7 all vertical edges 60 have uniform intensities of illumination. By contrast, FIG. 8 shows a reimaged replica of the photomask of FIG. 7 when rotated 90°. In this orientation, a cumulative positional error is exhibited. Vertical edges in column 62 have maximum intensity, however, vertical edges in columns 63, 64, and 65 have gradually decreasing intensity. In actual photographs, (not shown) obtained by means of the apparatus described herein, 19 reimaged elements appear in each row, and slightly less than one cycle of illumination is exhibited across each row. The element pitch is 45 mils; hence, the results demonstrate a resolution of about 0.1 mil over a 1 cm. field.

The invention has been particularly described in connection with the inspection of a single row of elements in a two-dimensional photomask array. However, it can also be useful in checking the row-to-row alignment of the mask since the intensity of illumination of corresponding reimaged border edges in the respective rows will differ by an amount proportional to the degree of misalignment of the rows.

It will be further evident, moreover, that the capability of the invention for detecting cumulative positional errors is not limited to mask inspection purposes but may be used in connection with many other types of linear arrays or gratings of repetitive elements whose corresponding points are nominally separated by a predetermined distance. In this connection, it will be understood that while the wavelength adjustment of the standing wave has been illustratively accomplished by adjusting the angle of intersection between the beams, such wavelength may also be set by other means, as by adjusting the wavelength of the beams.

What is claimed is:

1. A method of measuring a cumulative positional error along a linear array of repetitive regions which are nominally spaced apart by a predetermined distance, which comprises the steps of:
   illuminating the successive regions in the array with a superposed optical fringe pattern; and
   adjusting the spatial period of the fringe pattern to a value less than half the predetermined distance to cyclically vary the intensity of illumination of the successive regions with a period inversely proportional to the magnitude of the cumulative positional error along the array, whereby a variation of intensity from a maximum to a minimum between a pair of spaced regions of the array is indicative of a cumulative positional error therebetween of one-half the spatial period of the pattern.

2. A method as defined in claim 1, in which the spatial period of the fringe pattern is adjusted to an integral submultiple of the predetermined distance.

3. A method of measuring a cumulative positional error along a linear array of identical elements having corresponding border edges that are nominally spaced apart by a predetermined distance, which comprises the steps of:
   directing, through the array, an aligned fringe pattern of light whose spatial period is less than half the predetermined distance to spatially modulate the light;
   focusing the spatially modulated light on a low-pass optical filter which transmits spatial wavelengths longer than half the predetermined distance but stops spatial wavelengths shorter than half the predetermined distance; and
   reimaging the light passed by the filter to define a visual replica of the border edges of the array, the resulting intensity of illumination of successive edges in the replica array by the modulated light varying cyclically with a period inversely proportional to the magnitude of the cumulative positional error; whereby a variation in intensity from a maximum to a minimum between a pair of spaced edges on the replica array is indicative of a cumulative positional error therebetween of one-half the spatial period of the fringe pattern.

4. A method as defined in claim 3, comprising the further step of aligning a first one of the edges in the replica array with a point of maximum illumination of the modulated light.

5. A method of measuring a cumulative positional error along a row of elements on a photomask transparency wherein successive elements have corresponding border edges that are nominally spaced apart by a predetermined distance, which comprises the steps of:
   directing, through the row of elements, an aligned fringe pattern of light whose spatial period is an integral submultiple of the predetermined distance to spatially modulate the light;
   focusing the spatially modulated light on a low-pass optical filter which transmits spatial wavelengths longer than half the predetermined distance but stops spatial wavelengths shorter than half the predetermined distance; and
   reimaging the light passed by the filter to define a visual replica of the border edges of the successive elements, the resulting intensity of illumination of successive replica edges by the modulated light varying cyclically with a period inversely proportional to the magnitude of the cumulative positional error; whereby a variation in intensity from a maximum to a minimum between a pair of spaced replica edges is indicative of a cumulative positional error therebetween of one-half the spatial period of the fringe pattern.

6. In an apparatus for measuring cumulative positional errors in a linear array of repetitive elements having corresponding border edges that are nominally spaced apart by a predetermined distance:
   means for directing a pair of beams of coherent light through the array at an adjustable intersecting angle to generate an optical fringe pattern that is spatially modulated by the array;
   means for adjusting the angle of intersection to vary the spatial period of the fringe pattern;
   a low-pass optical filter for passing spatial wavelengths longer than half the predetermined distance and for blocking spatial wavelengths shorter than half the predetermined distance;
   means for focusing the light spatially modulated by the array on the filter; and
   means for reimaging the portion of the focused light passed by the filter to define a visual replica of the border edges of the array, the intensity of illumination of successive edges in the replica by the modulated fringe pattern varying cyclically with a period determined by the magnitude of the cumulative positional errors.